T. S. CLIFTON.
SAW SETTING TOOL.
APPLICATION FILED OCT. 16, 1915.
1,199,159.
Patented Sept. 26, 1916.
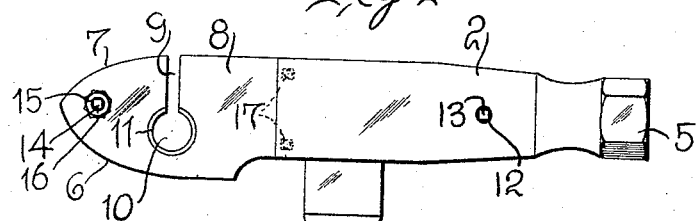
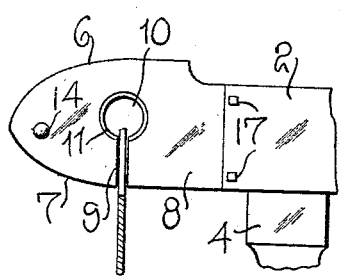
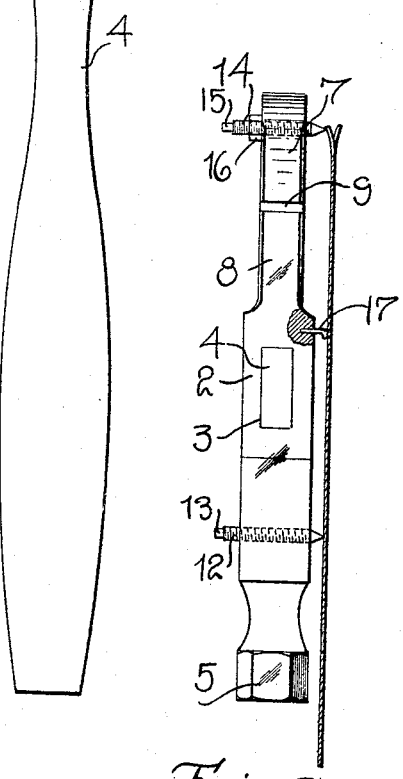
Inventor
THOMAS S. CLIFTON
By Watson E. Coleman
Attorney

UNITED STATES PATENT OFFICE.

THOMAS S. CLIFTON, OF MARVIN, VIRGINIA.

SAW-SETTING TOOL.

1,199,159.  Specification of Letters Patent.  Patented Sept. 26, 1916.

Application filed October 16, 1915. Serial No. 56,296.

*To all whom it may concern:*

Be it known that I, THOMAS S. CLIFTON, a citizen of the United States, residing at Marvin, in the county of Buchanan and State of Virginia, have invented certain new and useful Improvements in Saw-Setting Tools, of which the following is a specification, reference being had to the accompanying drawings.

My invention relates to implements, and particularly to implements for setting saws.

The general object of my invention is to provide an implement of the character which will be hereinafter described, so formed that it may be used as a hammer, as a saw set, and as a means for gaging the saw teeth. In other words, to provide a device which in one unitary construction combines a plurality of saw operating tools.

My invention is illustrated in the accompanying drawings, wherein:

Figure 1 is a side elevation of my improved implement; Fig. 2 is an elevation of one end thereof, showing the implement as used for setting saw teeth; Fig. 3 is an end elevation thereof, showing the implement as used for gaging saw teeth.

My improved tool comprises a body 2 which is formed with an eye 3 for the reception of a handle 4. One end of the body is formed to produce a hammer head 5. The other end of the body has an outwardly and medially curved face 6 and an inwardly or downwardly and medially curved face 7. This portion 8 of the body is relatively thinner than the main portion of the body and is deeper than this main portion. It is formed with the inwardly extending slit 9 which extends into and intersects a transversely extending bore 10, the walls of which are slightly beveled as at 11.

Disposed through the body between the eye 3 and head 5 is a screw 12 forming an adjustable stud as shown in Fig. 3, this screw having a pointed screw threaded shank and a many-sided head 13 whereby the screw may be screwed in and out by means of a wrench. At the opposite end of the body there is provided a screw 14, as shown in Fig. 3, constituting an adjustable gage pin whose shank is provided with a many-sided head 15 whereby a wrench may be applied to it, and this screw is held in its adjusted position by means of a jam nut or lock nut 16 which engages against the face of the body. Disposed between the eye 3 and the screw pin 14 are the outwardly projecting studs 17, as illustrated in Figs. 1 and 3. A line extending from the screw 12 to the screw 14 will extend midway between these studs 17.

The manner in which my invention is to be used and the advantages of the device are as follows: The slot 9 is for the purpose of bending the saw teeth, the teeth being inserted within the slot until the point of the tooth is about at the center of the bore 10. The head 2 is then grasped and pressed downwardly until the tooth has been set the required amount. The ends of the bore are beveled so as to prevent the tool from chipping if the bending operation should be too hard. The screws 12 and 14 and the studs 17 constitute together a "spider" or a tooth gage. In this use of the implement the stud 17 and the screw stud 12 are disposed against the face of the saw blade with the gage pin 14 opposite the end of one of the teeth. If the tooth contacts with the gage pin 14 as stated the tooth has been set to the proper gage. If it does not, however, the tooth is to be further bent until it coincides with the point of the gage pin. By adjusting the screw 14 the gage may be regulated to correspond with the different kinds of timber with which the saw is to be used. The lock nut 16 holds the screw 14 firmly in place when adjusted and prevents it from jarring loose while setting the saw or using the hammer. By making the screw 12 adjustable the side of the gage may be set parallel to the saw and the screw 12 be brought into proper relation to the stud 17.

The purpose of pointing that end of the body 2 carrying the screw 14 is to permit the workmen to see the point of each tooth and hold the point of the gage screw or pin 14 on the point of the lance teeth of the saw. It will be obvious that with my device the workmen can set the saw tooth and then immediately, by applying the head 2 to the face of the saw, can thereafter gage the set of any particular tooth. Furthermore, the device being in the form of a hammer, permits it to be used for a number of purposes in connection with the setting of saws.

While I have illustrated a certain detailed form for the head 2, I wish it understood that other forms might be used if desired.

Having thus described the invention, what I claim is:

A tool of the character described including an elongated member, a stud threaded through the member adjacent one end thereof, a gage pin threaded through the member adjacent the opposite end thereof, said pin and stud having corresponding extremities pointed, transversely spaced fixed studs extending from the side of the member adjacent the pointed extremities of the first named stud and pin, said fixed studs being arranged intermediate the first named stud and pin, and a locking member coacting with the gage pin and the body.

In testimony whereof I hereunto affix my signature in the presence of two witnesses.

THOMAS S. CLIFTON.

Witnesses:
T. H. RATLIFF,
EARVIN CLIFTON.

Copies of this patent may be obtained for five cents each, by addressing the "Commissioner of Patents, Washington, D. C."